United States Patent [19]

Erickson et al.

[11] Patent Number: 5,428,114
[45] Date of Patent: Jun. 27, 1995

[54] RANDOMLY EPOXIDIZED SMALL STAR POLYMERS

[75] Inventors: James R. Erickson, Katy; Steven H. Dillman, Houston; Dale L. Handlin, Jr., Houston; Carl L. Willis, Houston; Robert J. Sutherland, Houston, all of Tex.

[73] Assignee: Shell Oil Company, Houston, Tex.

[21] Appl. No.: 237,497

[22] Filed: May 3, 1994

Related U.S. Application Data

[62] Division of Ser. No. 63,612, May 18, 1993, abandoned, which is a division of Ser. No. 901,349, Jun. 19, 1992, Pat. No. 5,247,026.

[51] Int. Cl.$^6$ .................... C08F 36/06; C08F 236/06
[52] U.S. Cl. .................... 525/331.9; 525/94; 525/901
[58] Field of Search .................... 525/94, 331.9, 901

[56] References Cited

U.S. PATENT DOCUMENTS

| | | |
|---|---|---|
| 3,341,617 | 9/1967 | Schleimer et al. |
| 3,551,518 | 12/1970 | Pornin |
| 3,607,977 | 9/1971 | Taylor et al. |
| 3,607,982 | 9/1971 | Winkler et al. |
| 3,652,732 | 3/1972 | Makowski et al. |
| 3,699,184 | 10/1972 | Taylor et al. |
| 3,714,297 | 1/1973 | Blaise et al. |
| 3,743,616 | 7/1973 | Kest |
| 3,899,474 | 4/1975 | Goldenberg et al. |
| 3,970,608 | 7/1976 | Furukawa et al. |
| 4,051,199 | 9/1977 | Udipi et al. |
| 4,077,893 | 3/1978 | Kiousky ........ 252/560 |
| 4,131,653 | 12/1978 | Hsieh et al. |
| 4,131,725 | 12/1978 | Udipi et al. |
| 4,135,037 | 1/1979 | Udipi et al. |
| 4,417,029 | 11/1983 | Milkovich |
| 4,769,416 | 9/1988 | Gelling et al. |
| 4,879,349 | 11/1989 | Hoxmeier |

FOREIGN PATENT DOCUMENTS

| | | |
|---|---|---|
| 0295026 | 12/1988 | European Pat. Off. |
| 0438287 | 7/1991 | European Pat. Off. |
| 0449374 | 10/1991 | European Pat. Off. |
| 219779 | 3/1985 | German Dem. Rep. |
| 249029 | 8/1987 | German Dem. Rep. |
| 256709 | 5/1988 | German Dem. Rep. |
| 3442200 | 5/1986 | Germany |
| 61-042504 | 3/1986 | Japan |
| 61-136563 | 6/1986 | Japan |
| 62-257904 | 11/1987 | Japan |
| 01115978 | 5/1989 | Japan |
| 1035928 | 5/1963 | United Kingdom |
| 1294890 | 11/1972 | United Kingdom |

OTHER PUBLICATIONS

Kirk-Othmer Encyclopedia of Chemical Technology, Third Edition, vol. 19, pp. 607-623, published in 1982.

"Experimental Thermoplastic Rubbers for Enhanced Radiation Crosslinking of Hot Melt PSA's" by J. R. Erickson publ. May 1985.

Carbocationic Polymerization by Joseph P. Kennedy, pp. 82 and 138-140, published in 1982.

"Radiation Curing of PSA's Based on Thermoplastic Rubbers" by D. J. Clair, Mar. 1980 Adhesives Age.

"Recent Advances in the Chemical Modification of Unsaturated Polymers", by D. N. Shulz, S. R. Turner and M. A. Golub, Rubber Chemistry and Technology 5, 1982, pp. 809-859.

"Epoxidation of Polybutadiene and Styrene-Butadiene Triblock Copolymers with Monoperoxyphthalic Acid: Kinetic and Conformation Study", by W. Huang, G. Hsiue and W. Hou, Journal of Polymer Science: Part A: Polymer.

(List continued on next page.)

*Primary Examiner*—Melvyn I. Marquis
*Assistant Examiner*—D. Aylward
*Attorney, Agent, or Firm*—Donald F. Haas

[57] ABSTRACT

An epoxidized diene star polymer having greater than 4 arms and comprising from 0.05 to 5 Meq of di-, tri- and tetra-substituted olefinic epoxides and the molecular weights of the arms are from 1,500 to 15,000.

2 Claims, 1 Drawing Sheet

OTHER PUBLICATIONS

"Transition–Metal–Catalyzed Epoxidations", by K. A. Jorgensen, Chemical Reviews, vol. 89, No. 3, May 1989, pp. 431–457.

UV Curing: Science and Technology, Edited by S. P. Pappas, published in 1978 by Technology Marketing Corporation, pp. 23–77.

Photopolymerization of Surface Coatings, by C. G. Roffey, published in 1982 by John Wiley & Sons, pp. 41–136.

"Cationic Polymerization: Iodonium and Sulfonium Salt Photoinitiators", by J. V. Crivello, Advances in Polymer Science 62, 1985, pp. 1–48.

"UV Curing of Epoxides by Cationic Polymerization" by William R. Watt, Radiation Curing, Nov. 1986, pp. 7–25.

"Light Sources" by Vincent D. McGinnis of Battelle Columbus Laboratories.

"New Transparent Flexible UV–Cured Films from Polyisobutylene–Polyisoprene Block Polymers", Journal of Macromolecular Sci.-Chemistry, by Puskas, Kaszas and Kennedy, vol. A28, No. 1, 1991.

Research Disclosure 311115, Star Branched Polymers From Linear Polymer Terminated by Epoxy Moieties, Disclosed Anonymously.

RANDOMLY EPOXIDIZED SMALL STAR POLYMERS

BACKGROUND OF THE INVENTION

This is a division of application Ser. No. 08/063,612, filed May 18, 1993 abandoned which is a division of 07/901,349, Jun. 19, 1992 U.S. Pat. No. 5,247,026.

This invention relates to diene based, epoxidized star polymers suitable for crosslinking and adhesive, sealant and coating compositions made therefrom.

High molecular weight diene based styrenic block copolymers such as the family of KRATON® S-I-S, S-B-S, S-EP-S and S-EB-S block copolymers are extensively used as base polymers in the formulation of many types of hot melt applied coatings and adhesives. These materials offer advantages over other types of materials such as acrylic oligomer/acrylic monomer and polyol-/isocyanate monomer systems that are applied as 100% reactive systems and are cured by chemical or radiation means. An important advantage of the high molecular weight diene based styrenic block copolymers is the ability to provide non-polluting formulations and method of application that employs very benign raw materials, compared to the substantial risk associated with acrylate and isocyanate monomer based 100% reactive systems.

However, an important limitation of the styrenic block copolymers has been the inability to provide formulations with solvent and higher temperature resistance. This is because the styrenic block copolymers rely on physical association of the polystyrene blocks in the polymer for crosslinking and once the polystyrene domains in the polymer are weakened by solvent takeup or temperatures near or above the glass transition temperature of the polystyrene, cohesive strength is lost. This problem has been solved by the preparation of very high molecular weight block copolymers such as KRATON® D1320X rubber which can undergo covalent crosslinking by EB radiation to reinforce the physical crosslinking to give improved solvent and heat resistance. Another important limitation of the styrenic block copolymers is related to the otherwise very desirable hot melt application method. Many substrates cannot tolerate being exposed to hot melt temperatures, 300° F. to 450° F., without being severely damaged. This is the case for very thin polyolefin films, such as thin polyethylene film.

The present invention provides relatively high molecular weight diene based polymers having a very compact star structure with short arms which lowers the viscosity. These polymers do not have a distinct styrene block which would tend to raise application viscosity. The polymers of this invention have many of the property advantages of conventional styrenic block copolymers, including being safe to handle and being covalently crosslinkable for solvent and high temperature resistance. Additionally, the polymers of this invention can be applied as warm melts or as a 100% reactive so that they can be used on heat sensitive substrates. They are sprayable as well. Further, they cure readily, especially by UV radiation.

SUMMARY OF THE INVENTION

The present invention comprises randomly epoxidized star polymers, based on at least one conjugated diolefin monomer, that contain di-, tri- and/or tetrasubstituted olefinic epoxides. The polymers of the invention may or may not be hydrogenated and if they are hydrogenated, the hydrogenation may take place either before or after epoxidation. The polymers may be crosslinked through at least some of the epoxy functionality, preferably by radiation, and can be used to make rapid curing and heat stable adhesives, sealants, coatings, flexible printing plates, fibers and films, or used as modifiers for asphalt, polyesters, polyamides and epoxies.

The star polymers have greater than four arms or branches. Preferably, the polymers have more than eight arms, and most preferably, more than twelve arms. Each arm has a molecular weight from between 1,500 and 15,000, preferably from 2,000 to 10,000, and most preferably from 3,000 to 7,000. The concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milliequivalents of epoxide per gram of polymer (Meq/g), preferably from 0.1 to 3 Meq/g, and most preferably from 0.2 to 1 Meq/g.

DETAILED DESCRIPTION OF THE INVENTION

Figure 1:
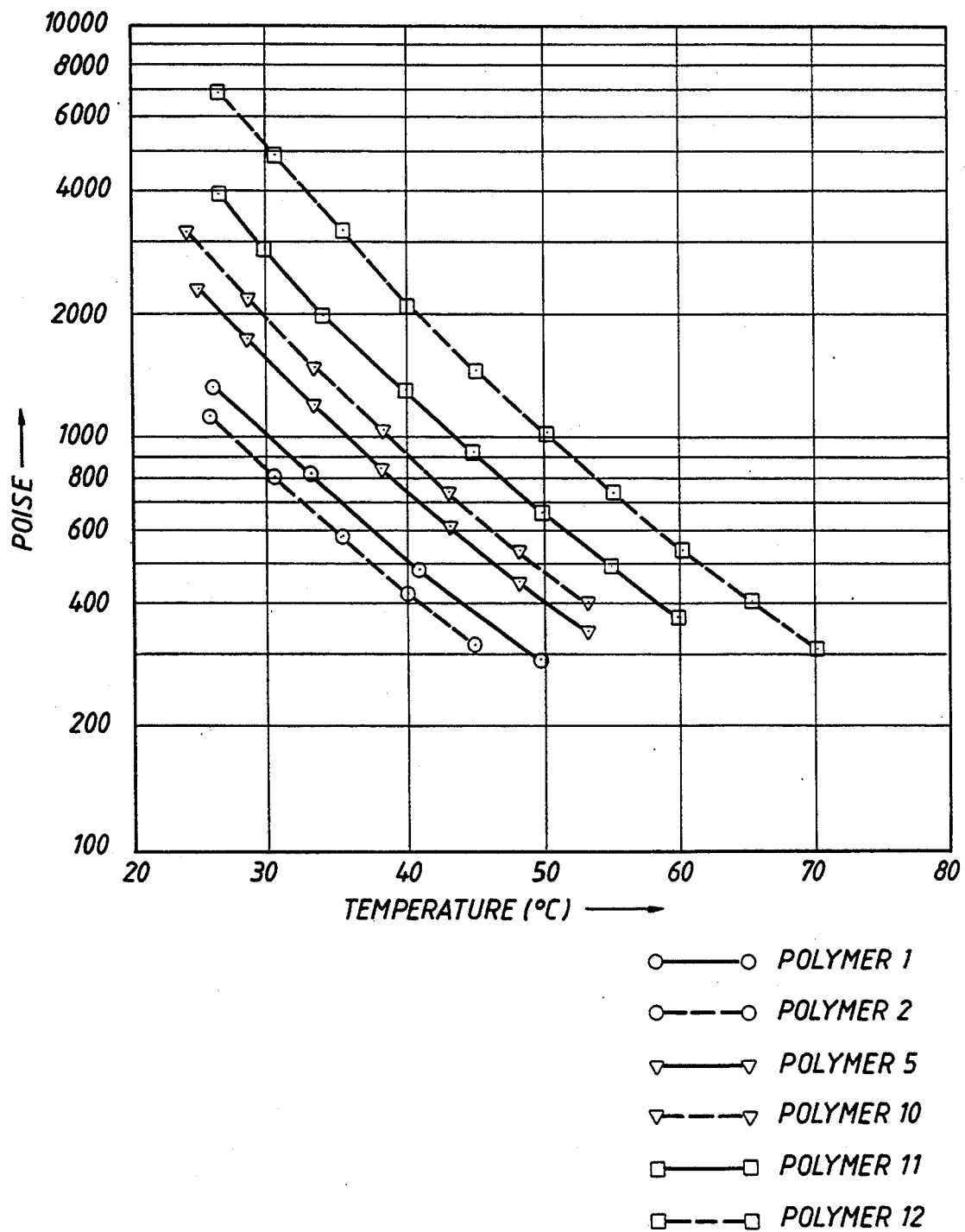
FIG. 1 is a plot of viscosity data from Example 2 which shows the relationship between the viscosities of the precursor and epoxidized polymers.

Polymers containing di-, tri- or tetrasubstituted olefinic unsatoration can be prepared by polymerizing one or more polyolefins, particularly diolefins by themselves or with one or more alkenyl aromatic hydrocarbon monomers. The polymers containing such olefinic unsaturation may be prepared using artionic initiators. Such polymers may be prepared using bulk, solution or emulsion techniques.

A very useful embodiment of this invention may be conveniently prepared by anionic polymerization, preparing arms D consisting of homopolymers or copolymers of conjugated diene monomers or copolymers of conjugated diene monomers and alkyl aryl monomers and then coupling the arms to make a star polymer. The amount of alkyl aryl monomers copolymerized in the D arms can be up to 99%, provided that enough conjugated diene monomer is used to assure the presence of a sufficient level of higher substituted olefinic double bonds for epoxidation.

Preferably, the polymer is epoxidized under conditions that enhance the epoxidation of the more highly substituted olefinic double bonds, such as by the use of peracetic acid, wherein the rate of epoxidation is generally greater the greater the degree of substitution of the olefinic double bond (rate of epoxidation: tetrasubstituted > trisubstituted > disubstituted > monosubstituted olefinic double bond). Sufficient epoxidation is done to achieve the desired level of epoxidation in the polymer (within the range of 0.05 to 5 Meq/g). $^1$H NMR can be used to determine the loss of each type of double bond and the appearance of epoxide.

If a substantially saturated polymer is desired, the epoxidized polymer is hydrogenated to remove substantially all remaining olefinic double bonds (ODB) and normally leaving substantially all of the aromatic double bonds. Alternatively, selective partial hydrogenation of the polymer may be carried out before epoxidation such that from 0.05 to 5 Meq of olefinic double bonds are left intact for subsequent epoxidation. In this case, the epoxidized polymer may be partially hydrogenated in a selective manner with a suitable catalyst and conditions (like those in Re 27,145, U.S. Pat. No. 4,001,199 or with a titanium catalyst such as is disclosed in U.S. Pat. No. 5,039,755, all of which are incorporated by reference; or by fixed bed hydrogenation) that favor the hydrogenation of the less substituted olefinic double bonds (rate or hydrogenation: monosubstituted > disubstituted > trisubstituted > tetrasubstituted olefinic double bonds) and also leaves aromatic double bonds intact, so as to leave some of the unsaturation intact in the D arms (and/or any portions of the optional M block or the C arms, discussed below, that may also contain unepoxidized higher substituted olefinic double bonds). The epoxidation does not need to be selective with respect to the degree of substitution on the olefinic double bonds, since the objective is usually to epoxidize as many of the remaining ODB's as possible.

Generally, if a hydrogenation step is used, sufficient improvement of the polymer's chemical and heat stability should be achieved to justify the extra expense and effort involved. For greatest heat stability, all of the olefinic double bonds, anyplace in the polymer, that are not epoxidized should be removed so that less than 1 Meq of ODB per gram of polymer remain, more preferably less than 0.6 Meq/g, and most preferably less than about 0.3 Meq/g of polymer.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls and anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. The conjugated diolefins which may be used in the present invention include isoprene (2-methyl-1,3-butadiene), 2-ethyl-1,3-butadiene, 2-propyl-1,3-butadiene, 2-butyl-1,3-butadiene, 2-pentyl-1,3-butadiene (2-amyl-1,3-butadiene), 2-hexyl-1,3-butadiene, 2-heptyl-1,3-butadiene, 2-octyl-1,3-butadiene, 2-nonyl-1,3-butadiene, 2-decyl-1,3-butadiene, 2-dodecyl-1,3-butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene (myrcene), 2-methyl-1,3-nonyldiene, 2-methyl-1,3-decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Also included are 1,3-butadiene, piperylene, 4,5-diethyl-1,3-octadiene and the like. Di-substituted conjugated diolefins which may be used include 2,3-dialkyl-substituted conjugated diolefins such as 2,3-dimethyl-1,3-butadiene, 2,3-diethyl-1,3-pentadiene, 2,3-dimethyl-1,3-hexadiene, 2,3-diethyl-1,3-heptadiene, 2,3-dimethyl-1,3-octadiene and the like and 2,3-fluoro-substituted conjugated diolefins such as 2,3-difluoro-1,3-butadiene, 2,3-difluoro-1,3-pentadiene, 2,3-difluoro-1,3-hexadiene, 2,3-difluoro-1,3-heptadiene, 2,3-fluoro-1,3-octadiene and the like. Alkenyl aromatic hydrocarbons which may be copolymerized include vinyl aryl compounds such as styrene, various alkyl-substituted styrenes, alkoxy-substituted styrenes, vinyl napthailene, alkyl-substituted vinyl napthalenes and the like.

Conjugated dienes can also be copolymerized with methacrylates, such as t-butyl methacrylate, as described in U.S. Pat. No. 5,002,676, which is incorporated herein by reference, and such copolymers can be epoxidized and hydrogenated as described herein. The preferred use position in the polymer for methacrylates, when used, is in the C arms.

There are a wide variety of coupling agents or initiators that can be employed. Any polyfunctional coupling agent which contains more than four reactive sites can be employed. Examples of the types of compounds which can be used are disclosed in U.S. Pat. No. 4,096,203, wherein incorporated by reference, and include the polyepoxides, polyisocyanates, polyimines, polyaldehydes, polyketones, polyanhydrides, polyhalides, and the like. These compounds can contain two or more types of functional groups such as the combination of epoxy and aldehyde groups, isocyanate and halide groups, and the like. Many suitable types of these polyfunctional compounds have been described in the literature. Coupling monomers are coupling agents where several monomer units; are necessary for every chain end to be coupled. Divinylbenzene (DVB) is the most commonly used coupling monomer and results in star polymers.

In general, any of the solvents known in the prior art to be useful in the preparation of such polymers may be used. Suitable solvents, then, including straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetraline, decal in and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0° and 100° C. using an alkyl lithium initiator. The living polymer chains are usually coupled by addition of divinyl monomer to form a star polymer.

Additional monomers may or may not be added to grow more arms, C arms, or to terminally functionalize, such as with ethylene oxide or carbon dioxide to give hydroxyl or carbonyl groups, respectively, and the polymer and the living chain ends are quenched with a proton source such as methanol or hydrogen. Polymerization may also be initiated from monomers such as m-divinylbenzene and m-diisopropenylbenzene treated with butyl lithium.

The polymers can be either symmetric or asymmetric star (centrally branched) polymers of the basic formula $(A-M_p)_n-X-C_r$, wherein A is the diene containing block, M is an optional miniblock and C is an optional arm (branch) consisting of one or more blocks. The $A-M_p$ arms (branches) are referred to as D arms when it is convenient to do so. The blocks themselves may be homopolymer or copolymer blocks.

M is a miniblock of monomer that can be used to affect the number or stability of the arms coupled or originating at X. The molecular weight of M is greater than 50 and less than 1000. M is a vinyl aromatic hydrocarbon or a diene, typically oligostyrene or oligoisoprene. For instance, when coupling anionically prepared $A^-$ living arms, where A is polybutadiene, with commercial DVB-55 the degree of coupling to make the star is often less than 80%, with greater than 20% of the arms remaining unattached to the main star mode in the final product. The exact amount left unattached is very dependent upon the exact conditions of the coupling reaction, such as the amount of ether cosolvent used, the time elapsed after polymerization of the A blocks and the temperature of the polymer solution during the DVB-55 addition. In contrast, when a small miniblock of oligoisoprene is incorporated to make the A—M arm (D), the coupling reaction is less sensitive to reaction conditions and higher degrees of coupling can be achieved. Further, presence of the miniblock can be additionally beneficial when the polymer is being used under harsh service conditions, such as high temperature use, because a completely saturated block like oligostyrene or an epoxidized oligoisoprene may prevent scission of the arm from the star at the core of the star.

X sits at the junction point or region in the polymer molecule at which the arms (branches) of the polymer connect and represents the agent or agents that function as the connector. Generally X either represents coupling agents or monomers that cause the majority of the arms to join together after polymerization of the arms, or represents an initiator with an active functionality greater than 4 from which polymerization of the arms takes place.

Asymmetric star polymers, by definition, require the use of the optional C arms, which, are necessarily different than the D arms either in composition or molecular weight or both. C arms are segments that are usually prepared from one or more of the monomers used to prepare the D arms. The molecular weight of a C arm is from 50 to 15,000, preferably 500 to 10,000. The linear size of arms of greater length gives polymers with high application viscosities. Sometimes it is useful to prepare C from monomers other than those used in D. For instance, a methacrylate monomer, such as t-butyl methacrylate, can be added to a DVB-coupled star prior to termination and the arms C can be grown out from the living DVB core of the star. Also, C can be formed from a polyvinyl aromatic hydrocarbon. Combinations of the monomers can also be in C.

The subscripts are integers that indicate how many times a particular arm or miniblock is present on a particular polymer. The subscript p is 0 or 1, n and r are integers where $n \geq 2$, $r \geq 0$, and n+r is the total number of arms and ranges from 5 to 100, preferably from 8 to 60, and most preferably from 12 to 40. When p equals 0 or r equals 0 there is no miniblock M or no C arms. Preferably $n \geq r$.

As the number of arms increases, so does the average molecular weight of the polymer, which substantially increases the polymers ability to cure easily, such as with very low dose radiation, because the number of cure sites (epoxide sites) increases in proportion to the molecular weight at any fixed concentration of epoxide in the polymer. Fortunately, the substantially increased polymer molecular weight causes very little increase in viscosity because of the compact nature of a star polymer. However, trying to attain the highest possible number of arms on a star polymer results in the formation of some gel during the manufacture of the polymer, which may make subsequent processing and filtering of the polymer during manufacture, light scattering analysis for molecular weight, or application of the polymer difficult or impossible. This is why the most preferred upper bound for the number of arms is 40.

A special case is where A is a polyisoprene block polymerized under conditions that yields primarily, i.e. at least 50%, 1,4-polyisoprene, for which the residual double bonds are trisubstituted. Other special cases are where A is primarily 1,4-butadiene, a copolymer of primarily polyisoprene and butadiene or where the A block is a random polyisoprene/polystyrene copolymer in which a majority of the polyisoprene is 1,4polyisoprene. D arms may be made from a copolymer of isoprene and butadiene and the isoprene can be preferentially epoxidized. Isoprene and butadiene arms may be made in two different reactors and then blended and coupled with DVB to make an asymmetric star polymer (other methods may be used to make such polymers). Either epoxidation alone, epoxidation first followed by hydrogenation, or partial hydrogenation of these polymers first followed by epoxidation, works extremely well. When A is polybutadiene, it often is convenient to use a miniblock M where M is oligoisoprene or oligostyrene. Star polymers are normally made by a coupling reaction using divinyl monomer such as divinylbenzene. Like any coupling reaction, it does not go to 100% completion and some unattached arms will be present. The value of n is determined after the polymer is made. The best way to assign the n values is to measure the weight average molecular weight of the polymer by light scattering as described below, including pure star and unattached arms, subtract from it the portion of the mass due to the coupling monomer and then divide this corrected weight average molecular weight by the molecular weight of the arm which is usually the peak molecular weight determined by GPC as described below.

Molecular weights of unassembled linear segments of polymers such as arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, M. W. Yau, J. J. Kirkland, D. D. Bly, John Wiley & Sons, New York, N.Y., 1979.
2. *Light Scattering from Polymer Solutions*, M. B. Huglin, ed., Academic Press, New York., N.Y. 1972.
3. W. Kay and A. J. Havlik, *Applied Optics*, 12, 541 (1973).
4. M. L. McConnell, *American Laboratory*, 63, May, 1978.

Each arm has a molecular weight from 1,500 to 15,000, preferably 2,000 to 10,000, and most preferably 3,000 to 7,000. These arm molecular weights are very important to obtaining a low viscosity polymer for ease of application. There are large viscosity penalties to be paid if the arm length is either smaller than 1,500 or greater than about 15,000. It was totally unexpected that arm lengths below 1,500 could far exceed viscosities at considerably higher arm molecular weights. The range of 2,000 to 10,000 is preferred because it greatly reduces the possibility of straying into a much higher viscosity area, especially on the low arm molecular weight side. The range of 3,000 to 7,000 is most preferred because arms in this range will be at or very near the absolute minimum in viscosity, Polymers of this invention based on 1,4-polybutadiene have similar or lower viscosity than similar polymers based on 1,4-polyisoprene. It is also the case that polymerizing to incorporate styrene, more 1,2-polybutadiene or more 3,4-polyisoprene, all of which raise the Tg of the A arms, will cause the viscosity to rise at a fixed D arm molecular weight.

Upon epoxidation, the Meq of such epoxide per gram of the polymer will be from 0.05 Meq/g to 5 Meq/g, preferably from 0.1 to 3 Meq/g and most preferably 0.2 to 1 Meq/g. If there were greater epoxidation, the polymers would over crosslink, have little elasticity and be unsuitable for the applications intended. 0.2 to 1 Meq/g is preferred to obtain good UV curing and maintain pressure sensitive properties.

Some other advantages of relatively low levels of epoxidation are:
the manufacturing cost is lower because less epoxidizing agent is used;
can, maintain the polymer as an elastic material because the crosslinking will not be dense; and
the polymer will be more hydrophobic so water will be less of a problem for cationic curing.

The epoxidized copolymers of this invention can be prepared by the epoxidation procedures as generally described or reviewed in the *Encyclopedia of Chemical Technology* 19, 3rd ed., 251-266 (1980), D. N. Schulz, S. R. Turner, and M. A. Golub, *Rubber Chemistry and Technology*, 5, 809 (1982), W-K. Huang, G-H. Hsuie, and W-H. Hou, *Journal of Polymer Science, Part A: Polymer Chemistry*, 26, 1867 (1988), and K. A. Jorgensen, *Chemical Reviews*, 89, 431 (1989), and Hermann, Fischer, and Marz, *Angew, Chem. Int. Ed. Engl.* 30 (No. 12), 1638 (1991), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of 0° to 130° C. and reaction times from 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid, it is preferable to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag, or with methyl-trioxorhenium/hydrogen peroxide with and without amines present. $^1$H NMR is an effective tool to determine which and how much of each type of ODB is epoxidized. Further, the amount of epoxy can also be measured by the direct titration with perchloric acid (0.1N) and quaternary ammonium halogenide (tetraethylammonium bromide)where the sample is dissolved in methylene chloride. Epoxy titration is described in *Epoxy Resins Chemistry and Technology*, edited by Clayton A. May and published in 1988 (p. 1065) which is herein incorporated by reference.

An epoxidized polymer of the present invention can be further derivatized by a subsequent reaction either separately or in-situ to provide useful reactive elastomeric binders that have reactive functionality other than the epoxy group. Examples of these reactions are described by copending, commonly assigned applications, "Hydroxyl Functional Derivatives of Epoxidized Diene Polymers and Process for Making Them", Ser.

No. 863,580 and "Hydroxyl Functional Derivatives of Epoxidized Diene Polymers and Process for Making Them (II)", Ser. No. 863,648, both filed on Apr. 3, 1992, which are herein incorporated by reference. Epoxy groups can be converted to hydroxyl functionality, capable of crosslinking with amino-formaldehyde resins or isocyanates, by reduction or reaction with water. Reaction with azide ion, reaction with cyanotrimethylsilane followed by reduction or reaction with dialkylaminosilanes, ammonia, or amines will give polymers containing both amino and hydroxyl functionality that can be used to enhance adhesion to cellulosic substrates or provide reactive sites for isocyanate cure. Reaction with amino or mercapto acids can be used to prepare polymers containing hydroxyl and carboxylic acid functionality, providing greater adhesion to metals or to basic polymers such as nylon. Reaction with mercaptosilanes can be used to prepare polymers containing the elements of coupling agents, providing excellent adhesion to glass. These functional groups may also be introduced in the form of protected functional groups by reaction of the epoxy with the appropriately functionalized organometallic reagent (lithium organocuprates, Grignard reagents). Hydroxyl and aldehyde functionality may also be introduced by hydroformylation. Reactions with acrylamides and acrylic acids will introduce sites for free radical grafting. Further neutralization of the carboxylic acid or amine-containing polymer with base or acid will give varying amounts of water dispersability, depending on the level of functionality and neutralization.

A partially hydrogenated, but not epoxidized, polymer of the present invention can be further derivatized as well. Such a polymer can be halogenated, for example, by reacting it with a solution of HBr in acetic acid, or with chlorine ($Cl_2$) or bromine ($Br_2$), either gaseous, or in solution. A wide variety of species, including alcohols, carboxylic acids and nitriles, can be added across the double bond in the presence of protic acids to form the corresponding ethers, esters and amides. Acid chlorides and anhydrides can be added across the double bond in the presence of Lewis acids. A wide variety of species containing active protons, including thiols, primary alcohols and amines, aldehydes and species of the structure $ZCH_2Z'$, where Z and Z' are electron withdrawing groups, such as $NO_2$, CN, or $CO_2H$, can be added across the double bond in the presence of radical generators, such as organic peroxides. Hydroboration can be used to prepare the alkylborane, as described in S. Ramakrishnan, E. Berluche, and T. C. Chung, *Macromolecules*, 233, 378 (1990), and subsequent papers by T. C. Chung. The alkylborane derivative may then be transformed to the alcohol, or amine, or other functional groups. Diazo compounds may be added to the double bonds, either under the influence of heat, or metal catalysts, such as Cu and Rh salts. Reactive dienophiles, such as maleic anhydride and di-t-butyl azodicarboxylate can be added to the double bond to form the anhydride or the hydrazide (which can be thermally converted to the hydrazine), respectively. Reactive dipoles, such as nitrile oxides and nitrones can be added to the double bond. Hydrogenation of the above mentioned derivatives can be used to introduce aminoalcohol functionality. A variety of oxidative reactions, including oxidation with potassium permanganate and sodium perborate, may be used to introduce hydroxyl groups.

The polymers of this invention are preferably cured (crosslinked) by ultraviolet or electron beam radiation, but radiation curing utilizing a wide variety of electromagnetic wavelengths is feasible. Either ionizing radiation such as alpha, beta, gamma, X-rays and high energy electrons or non-ionizing radiation such as ultraviolet, visible, infrared, microwave and radio frequency may be used. The details of radiation curing are given in commonly assigned copending application Ser. No. 692,839, filed Apr. 28, 1991, U.S. Pat. No. 5,229,464, "Viscous Conjugated Diene Block Copolymers" and Ser. No. 772,172, filed Oct. 7, 1991 U.S. Pat. No. 5,382,604, "Crosslinked Epoxy Functionalized Block Polymers and Adhesives," both of which are herein incorporated by reference.

Reactive (curable) diluents that can be added to the polymer include epoxy, vinyl ether, alcohol, acrylate and methacrylate monomers and oligomers. Such polymers and other diene-based polymers may also be added or blended. Examples of epoxy reactive diluents include bis(2,3-epoxycyclopentyl)ether (Union Carbide EP-205), vinyl cyclohexene dioxide, limonene oxide, limonene dioxide, pinene oxide, epoxidized fatty acids and oils like epoxidized soy and linseed oils.

The polymers may also be cured without the use of radiation by addition of a cationic initiator. Suitable initiators include the halides of tin, aluminum, zinc, boron, silicon, iron, titanium, magnesium and antimony, and the fluoroborates of many of these metals. $BF_3$ complexes such as $BF_3$-ether and $BF_3$-amine are included. Also useful are strong Bronsted acids such as trifluoromethanesulfonic (triflic acid) and the salts of triflic acid such as FC-520 (3M Company). The cationic initiator is chosen to be compatible with the polymer being crosslinked, the method of application and cure temperature. The epoxy-containing polymers may also be crosslinked by the addition of multifunctional carboxylic acids, acid arthydrides, and alcohols, and in general by the curing methods described in U.S. Pat. No. 3,970,608, which is incorporated by reference. Volatile amines can be used to inhibit or retard unwanted cure, such as to maintain fluidity in one pack formulations until they are applied and reach the appropriate bake temperature for cure. They may also be cured by use of amino resins in the presence of a proton donating acid such as is described in "Method of Chemically Crosslinking Sterically Hindered Epoxidized Polymers", Ser. No. 863,644, filed Apr. 3, 1992, which is abandoned, commonly assigned and herein incorporated by reference. Radiation crosslinking is preferred because reactive ingredients do not come in contact with warm adhesives.

The crosslinked materials of the present invention are useful in adhesives (including pressure sensitive adhesives, contact adhesives, laminating adhesives and assembly adhesives), sealants, coatings, films (such as those requiring heat and solvent resistance), printing plates, fibers, and as modifiers for polyesters, polyethers and polyamides. The polymers are also useful in asphalt modification. In addition to the functionalized polymer and any curing aids or agents, products formulated to meet performance requirements for particular applications may include various combinations of ingredients including adhesion promoting or tackifying resins, plasticizers, fillers, solvents, stabilizers, etc. as described in detail in the aforementioned commonly assigned applications which are incorporated by reference.

Compositions of the present invention are typically prepared by blending the components, preferably between 25° C. and 125° C., until a homogeneous blend is obtained, usually less than three (3) hours. Various methods of blending are known to the art and any method that produces a homogeneous blend is satisfactory. The resultant compositions may then preferably be used in a wide variety of applications. Alternatively, the ingredients may be blended into a solvent.

Adhesive compositions of the present invention may be utilized as many different kinds of adhesives for example, laminating adhesives, flexible packaging laminated adhesives, pressure sensitive adhesives, tie layers, hot melt adhesives, solvent borne adhesives and waterborne adhesives in which the water has been removed before curing. The adhesive can consist of simply the epoxidized polymer or, more commonly, a formulated composition containing a significant portion of the epoxidized polymer along with other known adhesive composition components. A preferred method of application will be warm melt application at a temperature 20° to 125° C. because warm melt application is non-polluting and can be used on heat sensitive substrates. The adhesive can be heated before and after cure to further promote cure or post cure. Radiation cure of warm adhesive is believed to promote faster cure than radiation cure at room temperature.

Preferred uses of the present formulation are in the preparation of pressure-sensitive adhesive tapes and the manufacture of labels or flexible packaging. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is zero, the compositions of the present invention may be used for adhesives that do not tear paper and molded goods and the like.

EXAMPLE 1

Polymer 1 was a symmetric star polymer, $D_n$—X, with polyisoprene arms, D, prepared by anionic polymerization. The polymer was prepared as follows. Isoprene monomer was fed to a reactor already charged with cyclohexane and sec-butyl lithium initiator, and the isoprene was completely polymerized to form the arms. DVB-55 was added to couple the arms, and after about one hour reaction time, methanol was added to terminate the living polymer. 0.102 pounds of the DVB-55 mixture (a product of Dow Chemical, containing about 55–56 wt. % divinylbenzene and about 42 wt. % ethylvinylbenzene) was used for every 1.000 pound of isoprene monomer. A sample was taken from the reactor just before the addition of the DVB-55, and was analyzed by GPC to determine the peak molecular weight of the polyisoprene arms. A value of 6820 was found. Thus, each arm consisted of about 100 isoprene mers, and about 5.3 mers of the DVB-55 monomer mixture per polyisoprene arm were used to couple and form the star polymer. GPC on the final star polymer indicated that the polymer was 92% coupled. The weight average molecular weight, $M_w$, of the polymer was measured be static light scattering. Dry polymer was dissolved in tetrahydrofuran and filtered through a 0.2 micron filter. The analysis wavelength was 632.8 nm, the temperature was 25.0° C. and the DRI was 0.135. The $M_w$ determined was 157,000. Hence, the average number of arms on the polymer was 21. $^1$H NMR on the final polymer indicated the arms consisted of 94% 1,4-polyisoprene and 6% 3,4-polyisoprene. The majority of the polymer was left in solution for epoxidations. The % polymer solids of the solution was determined to be 23.3%.

EXAMPLE 2

Preparation of polymers 2–9. These polymers were made by epoxidizing portions of Polymer 1 from Example 1 with peracetic acid (in a stirred glass flask with acid dripped in slowly and the reaction temperature was 60° C. and the reaction hold time was 3.5 hours) according to the recipes in Table 1 below.

TABLE 1

| Polymer | Polymer (gram recipes) | | | | | | | |
|---|---|---|---|---|---|---|---|---|
| | 2 | 3 | 4 | 5 | 6 | 7 | 8 | 9 |
| Polymer 1 solution (23.3% polymer) | 2505 | 1812 | 1003 | 136320 | 1812 | 1003 | 1812 | 1003 |
| 0.1 N NAOH | 13 | 19 | 10 | 1690 | 32 | 18 | 45 | 25 |
| peracetic acid solution | 63 | 92 | 51 | 8284 | 156 | 86 | 220 | 122 |
| | Meq epoxide per gram of polymer | | | | | | | |
| Theoretical | | | | | | | | |
| Basis Polymer 1 | 0.50 | 1.00 | 1.00 | 1.20 | 1.70 | 1.70 | 2.40 | 2.40 |
| Basis final epoxidized polymer | 0.49 | 0.98 | 0.98 | 1.18 | 1.66 | 1.66 | 2.31 | 2.31 |
| Experimental | | | | | | | | |
| By $^1$H NMR on epoxidized polymer | 0.45 | 1.06 | 1.07 | 1.17 | 1.74 | 1.89 | 2.88 | 2.72 |

Each polymer solution was completely neutralized with an equal volume of aqueous NaOH wash solution. The mixtures were stirred for about 30 minutes, agitation was stopped and the bottom water/sodium acetate layers were removed. Each of the polymer solutions were washed at least three more times with distilled water to remove residual sodium acetate. Polymers 3 and 4 were blended while still in solution to make a larger batch, designated polymer 10. Likewise, polymers 6 and 7, and polymers 8 and 9 were blended to make polymers designated polymer 11 and polymer 12, respectively. A small amount of a phenolic antioxidant was added to each polymer solution and then polymers 2, 3, 10, 11, and 12 were dried in a vacuum oven to remove the solvent.

The viscosities of Polymers 1, 2, 5, 10, 11 and 12 were measured using a Rheometrics Dynamic Mechanical Spectrometer with a parallel plate geometry. The measurements were made in dynamic mode at a shear rate of 10 radians per second and temperatures from 25° to 70° C. as shown in FIG. 1. FIG. 1 demonstrates that the low level of epoxidation in Polymer 2 (0.45 meg epoxide per gram) does not significantly change the viscosity from the basis Polymer 1. Higher levels of epoxidation in Polymers 5, 10, 11 and 12 show increased viscosity over the basis Polymer 1. All 6 polymers shown in FIG. 1 have similar reductions in viscosity with increasing temperature. Viscosity falls by a factor of approximately 10X for each 40° C. of temperature increase.

EXAMPLE 3

Polymer 13 was prepared by partially hydrogenating Polymer 1 using a nickel-aluminum catalyst under conditions that do not hydrogenate aromatic double bonds. The catalyst was washed out. The hydrogenation catalyst was made by the reaction of nickel 2-ethylhexanoate and triethylaluminum (Al/Ni ratio was about 2.3/1) and was used at 202 ppm nickel on a solution basis, at a pressure of 800 psi and a temperature ranging from 60° to 80° C. $^1$H NMR analysis was used to obtain experimental values for the residual olefinic double bonds left in the polymer.

|  | Meq epoxide/g polymer |
|---|---|
| 1,4-polyisoprene (trisubstituted ODB) | 2.03 |
| 3,4-polyisoprene (disubstituted ODB) | 0.02 |
| total = | 2.05 |

EXAMPLE 4

Preparation of polymer 14. Polymer 14 was made by epoxidizing a portion of polymer 13 from Example 3 with peracetic acid according to the procedure of Example 2 and the recipe below.

| Polymer 14 (gram recipe) | |
|---|---|
| Polymer 1 solution (23.3% polymer) | 2342 |
| 0.1 N NAOH | 50 |
| peracetic acid solution | 246 |
| Meq epoxide per gram of polymer Theoretical | |
| Basis Polymer 1 | 2.04 |
| Basis final epoxidized polymer Experimental | 1.98 |
| By $^1$H NMR on epoxidized polymer | 1.95 |

The polymer solution was completely neutralized with an equal volume of an aqueous NaOH wash solution, and then water washed to remove residual sodium acetate. A small amount of a phenolic antioxidant was added to the polymer solution and then the polymer 14 was dried in a vacuum oven to remove the solvent.

EXAMPLE 5

Polymer 15 was a symmetric star polymer, $D_n$—X, with polyisoprene arms, D, prepared by anionic polymerization. The polymer was prepared as follows. Isoprene monomer was fed to a reactor already charged with cyclohexane and sec-butyl lithium initiator, and the isoprene was completely polymerized to form the arms. DVB-55 was added to couple the arms, and after about one hour reaction time, methanol was added to terminate the living polymer. 0.129 pounds of the DVB-55 mixture was used for every 1.000 pound of isoprene monomer. A sample was taken from the reactor just before the addition of the DVB-55, and was analyzed by GPC to determine the peak molecular weight of the polyisoprene arms. A value of 3030 was found. Thus, each arm consisted of about 44 isoprene mers, and about 2.9 mers of the DVB-55 monomer mixture per polyisoprene arm were used to couple and form the star polymer. GPC on the final star polymer indicated that the polymer was 74% coupled. The weight average molecular weight, $M_w$ of the polymer was measured be static light scattering. Dry polymer was dissolved in tetrahydrofuran and filtered, with considerable difficulty, through a 0.2 micron filter. The analysis wavelength was 632.8 nm, the temperature was 25.0° C. and the DRI was 0.135. The $M_w$ determined was 198,000, but the value is not considered to be precise because of the experimental difficulties. Hence, the average number of arms on the polymer was about 58. $^1$H NMR on the final polymer indicated the arms consisted of 94% 1,4-polyisoprene and 6% 3,4-polyisoprene. The polymer was dried to remove the solvent.

EXAMPLE 6

Preparation of polymer 16. Polymer 16 was made by epoxidizing a portion of polymer 15 from Example 5 with peracetic acid according to the recipe below.

| Polymer 16 (gram recipe) | |
|---|---|
| Polymer 15 (23.3% polymer) | 69 |
| Cyclohexane | 128 |
| Sodium carbonate | 0.32 |
| peracetic acid solution | 15 |
| Meq epoxide per gram of polymer Theoretical | |
| Basis Polymer 1 | 1.00 |
| Basis final epoxidized polymer Experimental | 0.98 |
| By $^1$H NMR on epoxidized polymer | 0.80 |

After neutralization and water washing, a small amount of a phenolic antioxidant was added to the polymer solution, and polymer 16 was dried in a vacuum oven to remove the solvent.

EXAMPLE 7

Polymer 1 and polymer 10 were compared for ability to cure by UV irradiation. The following formulations were prepared. Zonatac 105 lite is a polyterpene tackifying resin from Arizona Chemical. Cyracure UVI-6974 is a photoinitiator made by Union Carbide.

| Formulation | 7-A | 7-B | 7-C |
|---|---|---|---|
| Polymer 1 | 100 | 30 | 0 |
| Polymer 10 | 0 | 70 | 70 |
| Zonatac 105 lite | 0 | 0 | 30 |
| Cyracure UVI-6974 | 0.93 | 0.93 | 0.93 |

-continued

| Formulation | 7-A | 7-B | 7-C |
| --- | --- | --- | --- |
| Tetrahydrofuran | 67 | 67 | 67 |

After all the components of the formulation were dissolved, films were cast onto 1 mil polyester film to give about 1.5 mils of coating when dried. The films were very sticky to the touch and lacked cohesive strength. The test films were prebaked for 2 minutes at 121° C. and then were irradiated with UV light from a Linde Photocure unit equipped with aluminum reflectors and one medium pressure Hg bulb. The films passed under the lamp at 30 feet per minute with the test formulation facing the incoming UV light. All three of the films remained sticky to the finger and had not developed good cohesive strength for at least 5 minutes after the UV treatment; they should have been good for laminating flexible backings. The films were then give a post thermal treatment of 10 minutes in a 121° C. oven. After this postcure, formulation 7-A still had not developed good cohesive strength, and 7-B was little better, whereas 7-C was tacky but had excellent cohesive strength. Each of the postbaked test films were measured for polymer gel content with the following results.

| Formulation | Polymer Gel, % |
| --- | --- |
| 7-A | 1 |
| 7-B | 12 |
| 7-C | 75 |

The gel data clearly shows that the unepoxidized star polymer 1 did not cure, and when blended in (at the 30% level) with polymer 10, retards the cure of epoxidized polymer 10. Whereas, formulation 7-C shows that the use of the polyterpene tackifying resin, Zonatac 105 lite at the 30% level, does not prevent epoxidized polymer 10 from curing sufficiently to provide good cohesive strength.

EXAMPLE 8

A portion of polymer 10 containing 1% Cyracure UVI-6974 was dissolved in THF and cast onto pieces of 1 mil polyester film. The dried film thickness was about 1.5 mils. The films were examined for gel content as a function of the curing treatments shown. In all cases the films were prebaked for 2 minutes in a 121° C. oven before the treatment, and were aged under ambient conditions for 1 day before starting the gel test.

| Treatment | Gel Content, % |
| --- | --- |
| Bake for 10 minutes in a 121° C. oven. | 1 |
| UV exposure at 99 fpm with Vycor filter in place. | 63 |
| UV exposure at 99 fpm with Vycor filter in place, followed by 10 minutes in a 121° C. oven. | 98 |

The results show how a polymer like polymer 10 can be applied warm without causing gel formation, and then can be activated by exposure to very low levels of UV light and will cure under ambient conditions with time, and how cure can be accelerated by application of mild heating. The action of the Vycor filter in the experiment was to reduce the effective amount of light reaching the substrate from the single medium pressure Hg bulb by a factor of about 4, so as to simulate the amount of UV light that would be seen at about 400 fpm if the filter is not in place.

EXAMPLE 9

Portions of polymers 2, 10, and 12 were dissolved in toluene and thin films were cast onto 1 mil polyester film. Dry film thickness of each polymer on the polyester film was about 1.5 mils. The films were prebaked for 2 minutes in a 121° C. oven to assure complete dryness, and were then cured with 3 Mrads of EB irradiation from an Energy Sciences CB-150 EB processor. The test films were measured for degree of cure (gel content) and for several typical pressure sensitive adhesive properties. All three of the polymers cured well to give strong films with good properties.

| Polymer | 2 | 10 | 12 |
| --- | --- | --- | --- |
| Epoxidation level, Meq/g (measured) | 0.45 | 1.07 | 2.80 |
| Gel Content, % | 83 | 85 | 87 |
| Rolling Ball Tack, cm | 1 | 2 | 2 |
| Polyken Probe Tack, g | 600 | 224 | 543 |
| Shear Adhesion Failure Temperature, °C. (1 in*1 in lap, 1000 g) | 123 | 139 | 143 |
| 95° C. Holding Power, min (1 in*1 in lap, 1000 g) | >1000 | >1000 | >1000 |

The SAFT was measured by $1'' \times 1''$ Mylar to Mylar lap joint with a 1 kg weight. SAFT (shear adhesion failure temperature) measures the temperature at which the lap shear assembly fails under load in an oven whose temperature is raised at a rate of 40° F. per hour. Rolling Ball Tack (RBT) is the distance in centimeters a steel ball rolls on the adhesive film with a standard initial velocity (PSTC test No. 6). Small numbers indicate aggressive tack. 95° C. Holding Power is the time required to pull a standard area ($1'' \times 1''$) of tape from a standard Mylar test surface under a standard load (1 kg), in shear at 2° antipeel. Polyken probe tack (PPT) was determined by ASTM D-2979. For HP and PPT, higher numbers indicate better performance for most pressure sensitive adhesive applications.

EXAMPLE 10

Portions of polymer 10 and polymer 12, each with 1% Cyracure UVI-6974 added, were dissolved in THF and cast onto flexible 1 mil polyester film. The polymer film thickness after evaporation of the THF was about 1.5 mils. The films were prebaked for 2 minutes in a 121° C. oven, UV cured at 30 fpm with no Vycor filter used, and postbaked for 10 minutes in a 121° C. oven. The films were tested for polymer gel formation and typical pressure sensitive adhesive properties.

| Polymer | 10 | 12 |
| --- | --- | --- |
| Epoxidation level, Meq/g (measured) | 1.07 | 2.80 |
| Polymer Gel Content, % | 99 | 98 |
| Rolling Ball Tack, cm | 4 | >12 |
| Polyken Probe Tack, g | 221 | 8 |
| Shear Adhesion Failure Temperature, °C. (1 in*1 in lap, 1000 g) | 98 | 105 |
| 95° C. Holding Power, min (1 in*1 in lap, 1000 g) | >1000 | >1000 |

The results show that polymer 10 is a much better pressure sensitive adhesive than polymer 12. Polymer 12 has a higher level of epoxidation and cures too much, by UV, to make as good a pressure sensitive adhesive as polymer 10.

EXAMPLE 11

Resin 17 (epoxidized S10) was prepared from Piccolyte S-10 polyterpene resin from Hercules in a manner similar to that used to prepare the epoxidized star polymers above (temperature ranged from 19° to 54° C. and the hold time was 1.75 hours).

| Resin 17 (gram recipe) | |
| --- | --- |
| Piccolyte S-10 | 479 |
| Cyclohexane | 930 |
| Sodium carbonate | 6.3 |
| peracetic acid | 293 |
| Meq epoxide per gram of polymer Experimental by epoxy titration epoxidized resin | 0.6 |

The resin solution was completely neutralized with an equal volume of an aqueous NaOH wash solution, and then water washed to remove residual sodium acetate. The resin solution was mixed with magnesium sulfate to remove any residual water and the magnesium sulfate was filtered out. The resin solution was vacuum dried to remove the solvent.

The following adhesive formulations were made using polymer 5 with Piccolyte S-10 and resin 17.

| Formulation | 11-A | 11-B |
| --- | --- | --- |
| Polymer 5 | 75 | 75 |
| Piccolyte S-10 | 25 | 0 |
| Resin 17 | 0 | 25 |
| Cyracure UVI-6974 | 1 | 1 |
| Irganox 1010 (antioxidant) | 1 | 1 |
| Tetrahydrofuran | 70 | 70 |

Formulations 11-A and 11-B were cast on 1 mil polyester film to give about 1.5 mils when dry. The test films were prebaked for 2 minutes in a 121° C. oven, UV irradiated at 30 fpm using no Vycor filter, and then immediately postbaked for 10 minutes in a 121° C. oven. The films of both test formulations remained soft and gooey immediately after the UV exposure. They developed excellent cohesive strength during the postbake. The films were tested for polymer gel content and PSA properties after the cure.

| Formulation | 11-A | 11-B |
| --- | --- | --- |
| Polymer Gel Content, % | 100 | 100 |
| Formulation Gel Content, % | 76 | 84 |
| Rolling Ball Tack, cm | >16 | 6 |
| Polyken Probe Tack, g | 0 | 202 |
| 95° C. Holding Power (1 in * 1 in, 500 g), | 4 min | 480 |
| Room Temperature Holding Power to Steel, min (1 in* 1 in, 500 g) | >4000 | >4000 |

The results above show the advantage of using an epoxidized polyterpene resin over the unepoxidized resin for improved adhesion. With UV cure the epoxidized polyterpene resin appears to have advanced in molecular weight and partially joined the polymeric gel network.

EXAMPLE 12

This example shows the ability of different resins to tackify polymer 14.

| Formulation 12 | A | B | C | D | E | F | G | H | I | K |
| --- | --- | --- | --- | --- | --- | --- | --- | --- | --- | --- |
| Polymer 14 | 100 | 75 | 75 | 75 | 75 | 75 | 75 | 75 | 75 | 75 |
| Piccolyte S-10 | 0 | 25 | 0 | 0 | 0 | 0 | 0 | 0 | 0 | 0 |
| Resin 17 | 0 | 0 | 25 | 0 | 0 | 0 | 0 | 0 | 0 | 0 |
| Regalrez 1094 | 0 | 0 | 0 | 25 | 0 | 0 | 0 | 0 | 0 | 0 |
| Escorez 5380 | 0 | 0 | 0 | 0 | 25 | 0 | 0 | 0 | 0 | 0 |
| Arkon P90 | 0 | 0 | 0 | 0 | 0 | 25 | 0 | 0 | 0 | 0 |
| Piccolyte S70 | 0 | 0 | 0 | 0 | 0 | 0 | 25 | 0 | 0 | 0 |
| Foral 85 | 0 | 0 | 0 | 0 | 0 | 0 | 0 | 25 | 0 | 0 |
| Piccolyte A-11 | 0 | 0 | 0 | 0 | 0 | 0 | 0 | 0 | 25 | 0 |
| Piccolyte C-11 | 0 | 0 | 0 | 0 | 0 | 0 | 0 | 0 | 0 | 25 |
| Toluene | 63 | 63 | 63 | 63 | 63 | 63 | 63 | 63 | 63 | 63 |

The test films were exposed to 3 Mrad of EB radiation and tested for pressure sensitive adhesive properties. Regalrez 1094 is a hydrogenated resin from Hercules. Escorez 5380 is a hydrogenated resin from Exxon Chemical. Arkon P90-resin from Arakawa Chemical. Piccolyte S70 is a polyterpene resin from Hercules, as are Piccolyte A-115 and C-115. Floral 85 resin is from Hercules.

| Formulation 12 | A | B | C | D | E | F | G | H | I | J |
| --- | --- | --- | --- | --- | --- | --- | --- | --- | --- | --- |
| Polymer Gel, % | 90 | 80 | 66 | 85 | 82 | 87 | — | 66 | 70 | 75 |
| Rolling Ball Tack, cm | 9 | 3 | 2 | 3 | 4 | 5 | — | 2 | 4 | 9 |
| Polyken Probe Tack, g | 132 | 362 | 490 | 308 | 382 | 330 | — | 908 | 965 | 541 |
| 180° peel from steel, pli | 0.2 | 0.5 | 1.5 | 0.7 | 0.5 | 0.6 | — | 1.8 | 2.0 | 2.0 |

180° peel is determined by PSTC test No. 1.

EXAMPLE 13

Polymer 18 was a symmetric star polymer, $D_n$—X, with polyisoprene arms, D, prepared by anionic polymerization. Preparation was almost identical to that of polymer 1. Polymer 18 was prepared as follows. Isoprene monomer was fed to a reactor already charged with cyclohexane and sec-butyl lithium initiator, and the isoprene was completely polymerized to form the arms. DVB-55 was added to couple the arms, and after about one hour reaction time, methanol was added to terminate the living polymer. 0.102 pounds of the DVB-55 mixture (a product of Dow Chemical, containing about 55–56 wt. % divinylbenzene and about 42 wt. % ethylvinylbenzene) was used for every 1.000 pound of isoprene monomer. A sample was taken from the reactor just before the addition of the DVB-55, and was analyzed by GPC to determine the peak molecular weight of the polyisoprene arms. A value of 4800 was found. Thus, each arm consisted of about 70 isoprene mers, and about 3.7 mers of the DVB-55 monomer mixture per polyisoprene arm were used to couple and form the star polymer. GPC on the final star polymer indicated that the polymer was 75% coupled. The weight average molecular weight, $M_w$, of the polymer was measured be static light scattering. Dry polymer was dissolved in tetrahydrofuran and filtered through a 0.2 micron filter. The analysis wavelength was 632.8 nm, the temperature was 25.0° C. and the DRI was 0.135. The $M_w$ determined was 85,000. Hence, the average number of arms on the polymer was 16. $^1$H NMR on the final polymer indicated the arms consisted of 94% 1,4-polyisoprene and 6% 3,4-polyisoprene.

EXAMPLE 14

Polymer 19 was a symmetric star polymer with polyisoprene arms. This polymer was prepared by an anionic process similar to that used in the synthesis of Polymer 1. The principle differences in this experiment were that the polymerization solvent was a mixture of cyclohexane/diethyl ether (9/1 wt/wt) and the coupling agent was DVB-80 (Dow Chemical) (m- & p-divinylbenzene, 78% wt, ethylvinylbenzene, 20% wt, diethylbenzene, 1% wt, naphthalene, 1% wt). In this example, the polyisoprene arm, before reaction with DVB, was found by NMR analysis to have a molecular weight (MW) of 1200 (1,4-addition=58%; 3,4-addition=42%). The living polyisoprene was coupled with DVB (DVB/Isoprene=0.526 wt/wt) affording a symmetrical star polymer. Analysis of the coupled polymer by GPC found essentially all of the polyisoprene arms were coupled to DVB cores. The polymer solution was quenched with water to remove any living chain ends that might have been present, washed repeatedly to remove lithium salts and concentrated to remove solvent. The polymer was isolated as a white solid and reserved for rheology studies.

Polymer 20 was a symmetric star polymer with polyisoprene arms. This polymer was prepared by an anionic process similar to that used in the synthesis of Polymer 19. The principle differences in this experiment were that the polyisoprene arm MW=2200 (basis NMR analysis) (1,4-addition=57%; 3,4-addition=43%) and the DVB/Isoprene=0.195 (wt/wt). Analysis of the coupled polymer by GPC found about 86% of the polyisoprene chains were coupled to divinylbenzene cores. The product was isolated (as described for Polymer 19) as a very viscous mass and reserved for rheology studies.

It is well known that for linear polymers the viscosity decreases as the molecular weight of the polymer decreases. We show in the table below that unexpectedly, this is not true for the star polymer of the current invention. The viscosities listed in the table below were measured on a Rheometrics Dynamic Mechanical Spectrometer at the temperatures noted. It is clear from the table below that the viscosity of polymers 19 and 20, which have arm molecular weights of less than 3,000 molecular weight, have substantially higher viscosities than Polymers 15 and 18 which have molecular weights greater than 3,000. Therefore there is an optimum range of molecular weights for star polymers of this type from about 3,000 to about 7,000. Since epoxidation results in only small increases in viscosity the same effect of arm molecular weight on viscosity for epoxidized polymers is expected.

| Polymer | Arm Molecular Weight | Viscosity (Poise) | Temperature (°C.) |
|---|---|---|---|
| 19 | 1,200 | $1.5 \times 10^6$ | 32.8 |
| 20 | 2,200 | 3,410 | 26.0 |
| 15 | 3,030 | 903 | 26.0 |
| 18 | 4,800 | 540 | 25.0 |
| 1 | 6,820 | 1,074 | 26.0 |

EXAMPLE 15

Preparation of polymers 21, 22, 23, and 24. The following ingredients were loaded into bottle reactors:

| | Polymer | | | |
|---|---|---|---|---|
| | 21 | 22 | 23 | 24 |
| | (grams, except where indicated) | | | |
| Cyclohexane | 231 | 244 | 229 | 249 |
| 1,3-butadiene | 27.9 | 28.4 | 28.5 | 28.2 |
| Sec-butyl lithium solution | 4.0 ml | 4.0 ml | 4.0 ml | 4.0 ml |
| DVB-55 | 3.97 | 2.65 | 0 | 0 |
| DVB-80 | 0 | 0 | 2.80 | 1.87 |
| Each of the polymers was evaluated by GPC. | | | | |
| Polybutadiene arm (D) peak molecular weight | 5300 | 5200 | 5200 | 5600 |
| Coupling Efficiency, % | 56 | 59 | 50 | 45 |

Portions of each of the above polymers were dried down after adding a small amount of a phenolic anitoxidant. The samples were analyzed by $^1$H NMR and were measured for complex viscosity by Rheometrics. NMR results showed that the polybutadiene was 9% 1,2-polybutadiene and 91% 1,4-butadiene, and that less than 2% of the cyclohexane remained in the polymers. The viscosity results are shown below.

| | Residual cyclohexane (%) | Measurement temperature (°C.) | Complex viscosity (poise) |
|---|---|---|---|
| Polymer 21 | 0.8 | 25 | 248 |
| Polymer 22 | 1.2 | 25 | 176 |
| Polymer 23 | 1.3 | 25 | 210 |
| Polymer 24 | 1.9 | 25 | 135 |

Each of the above polymers may be epoxidized as done in Example 2, Table 1. The star polymers of Example 15 have arms consisting of butadiene and have slightly lower viscosities than the polymers in Examples 1-5 because polybutadiene has a lower glass transition temperature than isoprene. Decreasing the Tg of the polymer backbone decreases the viscosity near room temperature. Similarly, increasing the Tg by the inclusion of styrene, high 3,4-isoprene or high 1,2-butadiene increases the viscosity. For example EKP 202, made by Shell Chemical Company, is a star polymer similar to those in the instant invention but containing nearly 50% styrene in the arms. The molecular weight of the arms is 5,800 and its viscosity at 24° C. is 732,000 poise, as compared to Polymer 1 which has a viscosity of 1,074 poise at 26° C. with an arm molecular weight of 6,820.

EXAMPLE 16

A glass polymerization bottle was equipped with a mechanical stirrer and a syringe through which chemicals were added. The bottle was flushed with and maintained under nitrogen. After the addition of 200 ml of cyclohexane, stirring was initiated. To the bottle were added 1.0 ml of N,N,N',N'-tetramethylethylenediamine and 4 drops of diphenylethylene. The solution was titrated with a s-butyllithium to a light orange color which did not change when an additional 1.5 ml of 1.4 M s-butyllithium were added. After 3.2 ml of isoprene (1524 g/arm) were added dropwise, 1.0 ml of divinylbenzene was added dropwise as the color of the solution turned to a dark red. The resulting solution was stirred for 20 minutes and 13.0 ml of t-butyl methacrylate (6190 g/arm) was added dropwise. The solution was stirred for two hours as the color faded to a light orange. Polymerization was terminated by addition of 10 ml of methanol. The solvent present was removed by evaporation and the resulting oil was coagulated in isopropyl alcohol, methanol and water.

EXAMPLE 17

To a glass polymerization bottle flushed with nitrogen and equipped with a stirrer were added 200 ml of cyclohexane and 20 ml of tetrahydrofuran and stirring was initiated. After the addition of 4 drops of diphenylethylene as an indicator, the solution was titrated to an orange color with s-butyllithium. An additional 1.5 ml of s-butyllithium was added. After stirring for 5 minutes, 3.2 ml of isoprene were added and the solution was stirred for 15 minutes as the color turned a light orange. After addition of 1.0 ml of divinylbenzene the solution was stirred for 10 minutes as the color, initially blood red, turned somewhat lighter. While stirring continued, 13.0 ml of t-butyl methacrylate were added. The polymerization was terminated by the addition of methanol and allowed to stand overnight as the color changed from water white to light yellow. The solvent was removed by evaporation and the resulting product was coagulated in methanol and water.

EXAMPLE 18

A glass polymerization bottle equipped with a stirrer was flushed with nitrogen and 200 ml of cyclohexane and 5.0 ml of diethyl ether were added. Stirring was initiated and after the addition of 4 drops of diphenylethylene as indicator the solution was titrated with s-butyllithium to an orange color. An additional 1.5 ml of s-butyllithium was added and the resulting solution was stirred for 15 minutes. As stirring continued, 3.2 ml of isoprene was added dropwise. One milliliter of divinylbenzene was then added as the color of the solution turned blood red. After stirring for 10 minutes as the color of the solution became lighter, 13.0 ml of t-butyl methacrylate were added as the solution turned light yellow in color. After 30 minutes the solution was almost water white. Polymerization was then terminated by addition of methanol and the polymeric product was coagulated in methanol and water.

I claim:

1. A conjugated diolefin star polymer of the formula $$D_n\text{---}X\text{---}C_r$$

wherein D is $(A\text{---}M_p)$; 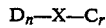

wherein A is a diene containing block which has a molecular weight of 1,500 to 15,000; and wherein C is a block or multiblock segment which has a molecular weight of from 50 to 15,000 and comprises at least one diene or vinyl aromatic hydrocarbon or methacrylate or combinations thereof but is not identical to D; and wherein the A blocks may comprise up to 99% of a monoalkenyl aromatic hydrocarbon monomer; and wherein M is a miniblock of a monomer selected from the group consisting of vinyl aromatic hydrocarbons and dienes and has a molecular weight of 50 to 1000; and wherein X is a coupling agent or coupling monomers or initiator, $n \geq 2$, $r \geq 1$, $n \geq r$, $n+r$ ranges from greater than 4 to 100 and p is 0 or 1, and wherein the polymer is partially hydrogenated such that it contains from 0.05 to 5 Meq per gram of polymer of randomly distributed di-, tri-, and tetra-substituted olefinic double bonds.

2. The polymer of claim 1 wherein C is comprised of a methacrylate.

* * * * *